United States Patent
Zanibelli et al.

(10) Patent No.: US 7,196,029 B2
(45) Date of Patent: Mar. 27, 2007

(54) PROCESS AND CATALYSTS FOR UPGRADING OF HYDROCARBONS BOILING IN THE NAPHTHA RANGE

(75) Inventors: Laura Zanibelli, Crema (IT); Virginio Arrigoni, Milan (IT); Fernando Albertos, Madrid (ES); Evangelina Atanes, Madrid (ES); Thierry Cholley, Lyons (FR); Febronio Panarello, Milan (IT)

(73) Assignees: Enitechnologie S.p.A., San Donato Milanese (IT); Repsol Petroleo S.A., Madrid (ES); Elf Antar France S.A., Courgevoie (FR); AGIP Petroli S.p.A., Rome (IT)

( * ) Notice: Subject to any disclaimer, the term of this patent is extended or adjusted under 35 U.S.C. 154(b) by 372 days.

(21) Appl. No.: 10/819,211

(22) Filed: Apr. 7, 2004

(65) Prior Publication Data
US 2004/0192540 A1  Sep. 30, 2004

Related U.S. Application Data

(62) Division of application No. 09/744,978, filed as application No. PCT/EP99/05577 on Aug. 3, 1999, now Pat. No. 6,746,598.

(30) Foreign Application Priority Data
Aug. 15, 1998  (EP) ................... 98202744

(51) Int. Cl.
*B01J 29/04* (2006.01)
*B01J 29/068* (2006.01)
*B01J 29/40* (2006.01)

(52) U.S. Cl. ............... 502/60; 502/63; 502/70; 502/71; 502/74; 502/77; 502/208; 502/210; 502/211; 502/213

(58) Field of Classification Search ......... 502/60, 502/63, 70, 71, 74, 77, 208, 210, 211, 213
See application file for complete search history.

(56) References Cited

U.S. PATENT DOCUMENTS

| | | |
|---|---|---|
| 3,156,640 A | 11/1964 | Hart |
| 4,629,717 A | 12/1986 | Chao |
| 4,808,560 A | 2/1989 | Oleck |
| 5,378,352 A | 1/1995 | Degnan et al. |
| 5,411,658 A | 5/1995 | Chawla et al. |
| 5,482,617 A | 1/1996 | Collins et al. |
| 5,576,256 A | 11/1996 | Monque et al. |
| 5,871,635 A | 2/1999 | Gupta et al. |
| 6,416,660 B1 | 7/2002 | Zanibelli et al. |
| 6,582,590 B1 | 6/2003 | Riley et al. |

FOREIGN PATENT DOCUMENTS

| | | |
|---|---|---|
| EP | 0 442 159 | 8/1991 |
| EP | 0 448 117 | 9/1991 |
| EP | 0 449 144 | 10/1991 |
| EP | 0543157 | 5/1993 |
| EP | 0550922 | 7/1993 |
| EP | 0 665 280 | 8/1995 |
| EP | 0908231 | 4/1999 |
| GB | 878035 | 12/1964 |
| GB | 2051120 | 6/1982 |
| JP | 61126196 | 6/1986 |

OTHER PUBLICATIONS

Derwent Publications, AN 86-193476, JP 61 126196, Jun. 13, 1996.

*Primary Examiner*—Elizabeth D. Wood
(74) *Attorney, Agent, or Firm*—Oblon, Spivak, McClelland, Maier & Neustadt, P.C.

(57) ABSTRACT

The present invention relates to the use of a catalytic system comprising a metal of group VIII, a metal of group VI, a metal oxide as carrier and suitable quantities of a component selected from a zeolite of the FER type, phosphorous, and a mixture thereof, in upgrading of hydrocarbons boiling in the naphtha range containing sulfur impurities, namely in hydrodesulfurization with contemporaneous skeleton isomerization of olefins contained in said hydrocarbons and/or with reduction of olefins hydrogenation, carried out in a single step.

13 Claims, 1 Drawing Sheet

PROCESS AND CATALYSTS FOR UPGRADING OF HYDROCARBONS BOILING IN THE NAPHTHA RANGE

CROSS-REFERENCE TO RELATED APPLICATIONS

The present application is a Divisional Application of U.S. application Ser. No. 09/744,978 filed Apr. 6, 2001, now U.S. Pat. No. 6,746,598, which is a 371 application of PCT/EP99/05577 filed Aug. 3, 1999.

The present invention relates to the use of a catalytic system comprising a metal of group VIII, a metal of group VI, a metal oxide as carrier and suitable quantities of a component selected from a zeolite of the FER type, phosphorous, and a mixture thereof, in upgrading of hydrocarbons boiling in the naphtha range containing sulfur impurities, namely in hydrodesulfurization with contemporaneous skeleton isomerization of olefins contained in said hydrocarbons and/or with reduction of olefins hydrogenation, carried out in a single step.

This catalytic system can be used in particular for upgrading of hydrocarbons boiling in the naphtha range deriving from cracking processes, preferably of hydrocarbons boiling in the naphtha range derived from FCC (fluid catalytic cracking).

In fact hydrocarbons boiling in the naphtha range from FCC (i.e. gasoline cut )are used as a component in the blending of reformulated gasolines. For this purpose, it must have a high octane number and also a low sulfur content, in compliance with the limits of the law, which are becoming more and more restrictive, to reduce the emission of contaminants. The sulfur present in the gasoline pool in fact mainly derives (>90%) from the gasoline cut deriving from FCC. This cut is also rich in olefins which have a high octane number. Hydrogenation processes suitable for desulfurizing also result in the hydrogenation of the olefins present and consequently cause a considerable reduction in the octane number (RON and MON). The necessity has therefore been felt for identifying a catalytic system which, combined with suitable hydrodesulfurization conditions, diminishes the sulfur in the hydrocarbons boiling in the naphtha range and at the same time reduces to the minimum the deterioration in the octane qualities (RON), which can be achieved for example by the skeleton isomerization of olefins present and/or by the inhibition of hydrogenation of olefins double bond.

The use of zeolites with medium pores as isomerization catalysts and the consequent octane recovery of loadings previously subjected to desulfurization, are already known (U.S. Pat. No. 5,298,150, U.S. Pat. No. 5,320,742, U.S. Pat. No. 5,326,462, U.S. Pat. No. 5,318,690, U.S. Pat. No. 5,360,532, U.S. Pat. No. 5,500,108, U.S. Pat. No. 5,510,016, U.S. Pat. No. 5,554,274, U.S. Pat. No. 599,439). For these processes, to obtain hydrodesulfurization with a reduced octane loss, it is necessary to operate in two steps using specific catalysts and reactors.

U.S. Pat. No. 5,378,352 describes a process in a single step for desulfurizing hydrocarbon fractions which boil within the range of gasolines by means of a catalyst comprising a metal of group VIII, a metal of group VI, a zeolite having a Constraint Index ranging from 1 to 12, and a metal oxide as a binder, at a process temperature which is preferably higher than 340° C. Suitable zeolites which can be used in this invention are the following: ZSM-5, ZSM-11, ZSM-22, ZSM-23, ZSM-35, ZSM-48, ZSM-50, MCM-22 and mordenite. The use of MCM-22 is indicated as being particularly preferred. In the example a catalyst containing MCM-22 in a high percentage with respect to the total weight of the catalyst (54 wt %) is used and the example relates to "heavy naphtha", a feed cut from FCC gasoline with a high S content, but poor in olefins and consequently not particularly subject to reduction in the octane number as a result of hydrogenation. The suitable process conditions are: temperature higher than 340° C., pressure about 4 to 100 atm, LHSV 0.5 to 10 h-1, ratio between hydrogen and the hydrocarbon feed comprised between 93 and 940 std l/l.

Catalytic materials containing metals of groups VI and VIII, a refractory carrier and a zeolite, for example ZSM-35, are described in EP 442159, EP 437877, EP 434123, for the isomerization and disproportionation of olefins; in U.S. Pat. No. 4,343,692 for hydrodewaxing; in U.S. Pat. No. 4,519,900, for hydrodenitrogenation, in EP 072220, for a two-step process comprising dewaxing and hydrodesulfurization; in U.S. Pat. No. 4,959,140 for a two-step hydrocracking process.

In addition a catalyst is known consisting of Co, 3.5% wt, Mo, 12.8% wt, alumina, 69.8% wt, and P, 2.84% wt, used for deep desulfuration of distillates.

Materials consisting of Mo, Co, alumina and zeolites of the MFI type combined with elements of group IIIA and VIB and also containing phosphorous are described in U.S. Pat. No. 5,576,256.

We have now unexpectedly found that it is possible to desulfurize hydrocarbons boiling in the naphtha range such as full range gasolines containing sulfur and olefins, deriving for example from FCC, with high conversion values, also at lower temperatures and pressures than those preferably used in the prior art, with contemporaneous skeleton isomerization of olefins and/or with very low extent of hydrogenation of olefins double bond, by means of a catalyst comprising a metal of group VIII, a metal of group VI, a metal oxide as carrier and suitable quantities of a component selected from a zeolite of the FER type, phosphorous and mixture thereof. The skeleton isomerization of olefins and/or the very low extent of hydrogenation of olefins double bond allow to obtain desulfurization of hydrocarbon boiling in the naphtha range with very low losses of RON (research octane number) and MON (motor octane number).

These results are not only obtained in the desulfurization of hydrocarbon cuts which boil within the range of "heavy naphtha" (130°–250° C.), i.e. cuts poor in olefins, but also in the case of "full range naphtha" feeds which boil within the range of 35°–250° C., i.e. in the case of cuts rich in olefins.

Figure 1:
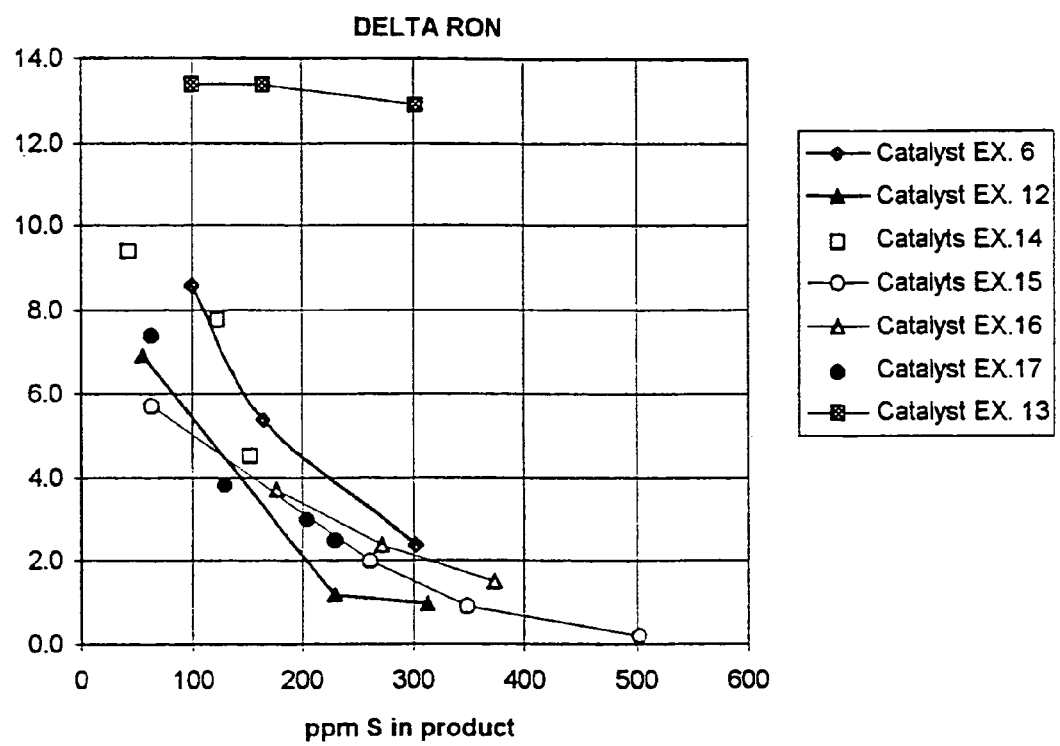
FIG. 1 shows RON and MON numbers as function of ppm S in the product, for the examples 29–35, where the catalysts 6 and 12–17 are tested in upgrading of a full range naphtha with the composition reported in table 4.
Figure 1:
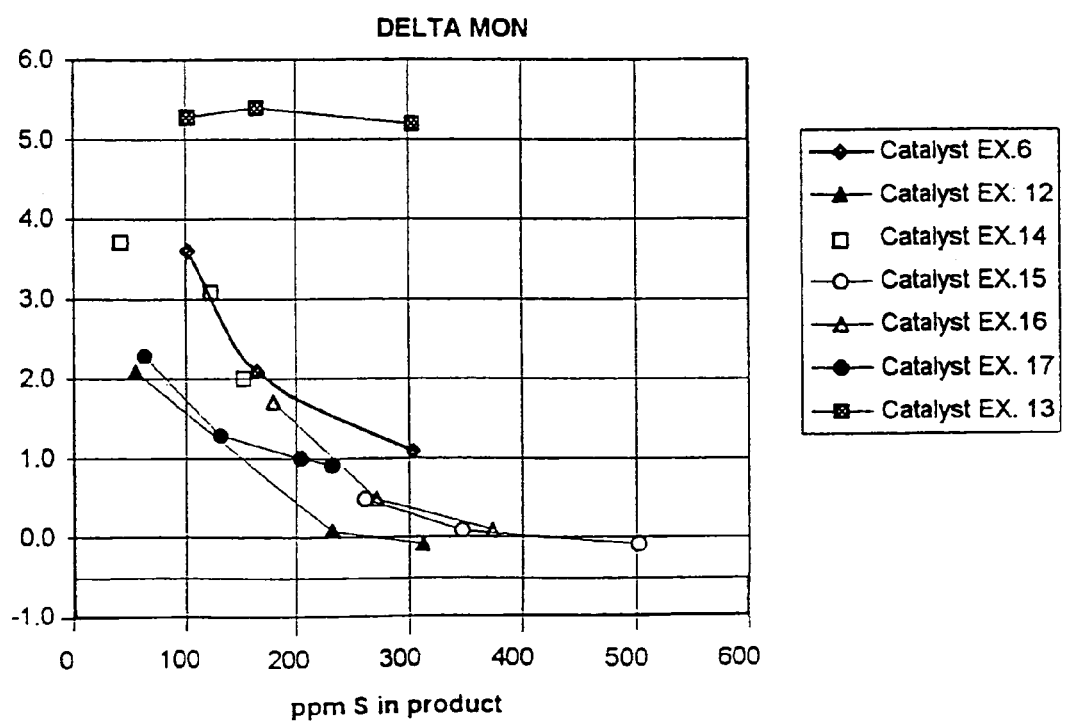

A first object of the present invention therefore relates to a process for desulfurizing hydrocarbons which boil within the range of 35° to 250° C., containing olefins and more than 150 ppm of sulfur, with possible skeleton isomerization of olefins, using a catalyst which comprises a metal of group VIII, a metal of group VI, a metal oxide as carrier and a component A selected from:

a) zeolite belonging to the FER type, in a quantity ranging from 5 to 30% by weight with respect to the total weight of the catalyst,
b) phosphorous in a quantity ranging from 0.1 to 10% weight, preferably from 1 to 5% wt, with respect to the total weight of the catalyst,
c) mixtures thereof, where when the component A is only phosphorous either the catalyst is obtained by impregnation of the metal oxide carrier with an aqueous solution of $H_3PO_4$ followed by impregnation with an aqueous solution of the metal of group VIII and an aqueous solution of the metal of group VI, or the catalyst is obtained by drying and calcination of a gel obtained mixing an alcohol dispersion containing a soluble salt of the metal of group VIII and an organic source of aluminum with an aqueous solution containing a soluble salt of the metal of group VI and $H_3PO_4$, or the catalyst is obtained by impregnation with an aqueous solution of $H_3PO_4$ of a gel, dried and calcined, obtained mixing an alcohol dispersion containing a soluble salt of the metal of group VIII and an organic source of aluminum with an aqueous solution containing a soluble salt of the metal of group VI.

The weight percentage of phosphorous refers to contents expressed as elemental phosphorous; in the final catalyst phosphorous is in form of oxide.

When the catalyst contains a zeolite of the FER type, this zeolite is present in a much lower quantity than that contained in the catalysts used in U.S. Pat. No. 5,378,352. Using this catalytic system characterized by a low content of FER zeolite, excellent desulfurization conversions are obtained, with contemporaneous skeleton isomerization of olefins, even at temperatures which are not high, at which there are lower losses of RON and MON than those caused by the same FER zeolites when used at quantities as high as those used in U.S. Pat. No. 5,378,352 both in the conditions of said patent and in the conditions selected in the present invention.

When the catalyst used in process of the present invention contains only phosphorous as component A, and is prepared by one of the three above described methods, it is possible to desulfurize the hydrocarbons and, at the same time, to have the advantage that the undesired side process of olefins hydrogenation is particularly reduced.

When the catalyst containing both phosphorous and a zeolite of FER type is used in the process for desulfurizing of the present invention, at the same time, the best results are obtained in isomerization. and reduction of hydrogenation.

Preferably the catalyst contains, as component A, a zeolite of FER type or mixtures of said zeolite and phosphorous, and therefore a particularly preferred aspect of the invention is a process for desulfurizing hydrocarbons which boil within the range of 35 to 250° C., containing olefins and more then 150 ppm of sulfur, with contemporaneous skeleton isomerization of said olefins, using a catalyst which comprises a metal of group VIII, a metal of group VI, a metal oxide as carrier and a component A selected from a zeolite belonging to the FER type, in a quantity ranging from 5 to 30% by weight with respect to the total weight of the catalyst, and mixtures of said zeolite belonging to the FER type, in a quantity ranging from 5 to 30% by weight with respect to the total weight of the catalyst, with phosphorous in a quantity ranging from 0.1 to 10% weight, preferably from 1 to 5% wt, with respect to the total weight of the catalyst.

Preferably the catalysts used in the process of the present invention contain Cobalt and/or Nickel as metal of group VIII, whereas the metal of group VI is preferably selected from molybdenum and/or tungsten. According to a particularly preferred aspect, Co and Mo are used. Preferably the weight percentage of metal of group VIII varies from 1 to 10% with respect to the total weight of the catalyst, more preferably from 2 to 6%, and the weight percentage of metal of group VI preferably varies from 4 to 20% with respect to the total weight of the catalyst, more preferably from 8 to 13.

The weight percentages of metal of group VI and metal of group VIII refer to contents of metals expressed as elemental metal of group VI and elemental metal of group VIII; in the final catalyst the metals of groups VI and VIII are in the form of oxides.

According to a particularly preferred aspect, the molar ratio between the metal of group VIII and the metal of group VI is less than or equal to 2, preferably less than or equal to 1.

The metal oxide used as carrier is selected from silica, alumina, silico-aluminas, titania, zirconia and mixtures of thereof. Alumina is preferably used.

When the catalyst contains a zeolite of the FER type, this zeolite can be natural or synthetic, and is selected from Ferrierite, FU-9, ISI-6, Nu-23, Sr-D, ZSM-35. FER structure type is a definition herein used in accordance with Atlas of Zeolite Structure Types, W. M. Meier and D. H. Olson, Butterworths.

Ferrierite is described in P. A. Vaugham, Acta Cryst., 21, 983 (1966), FU-9 is described in EP 55529, ISI-6 in U.S. Pat. No. 4,578,259, Nu-23 in EP 103981, Sr-D is described in Barrer et al., J. Chem. Soc, 1964,2296.

A particularly preferred aspect of the present invention is that the zeolite ZSM-35 is used. This zeolite is described in U.S. Pat. No. 4,016,245.

Preferably the zeolites are used in acid form, i.e. in the form in which their cation sites are prevalently occupied by hydrogen ions and a particulalry preferred aspect is that at least 80% of the cation sites is occupied by hydrogen ions. Preferably the zeolites in acid form have Si/Al ratio<20.

The catalyst used in the present invention containing zeolite FER as component A, preferably ZSM-35, can be prepared according to the traditional methods. For example by mixing the zeolite with the metal oxide followed by extrusion, calcination, a possible exchange process which reduces the sodium content, drying, impregnation with a solution containing a salt of a metal of group VI, drying, calcination and impregnation with a solution of a salt of a metal of group VIII, drying and calcination.

A particularly preferred aspect of the process of the present invention is to use a catalyst containing zeolite FER as component A, preferably ZSM-35, prepared by means of the sol-gel technique as follows:
a) an alcohol dispersion is prepared, containing a soluble salt of the metal of group VIII, the zeolite of the FER group and an organic source of aluminum;
b) an aqueous solution is prepared, containing a soluble salt of the metal of group VI and optionally formamide;
c) the alcohol dispersion and the aqueous solution are mixed, obtaining a gel;
d) aging of the gel at a temperature ranging from 10 to 40° C.;
e) drying of the gel;
f) calcination of the gel.

In step a) the metal salt of group VIII is for example nitrate, hydroxide, acetate, oxalate and preferably nitrate. The organic source of aluminum is preferably aluminum-trialkoxide having the formula $(RO)_3Al$, wherein R is an alkyl containing from 2 to 6 carbon atoms, and is preferably isopropyl or sec-butyl.

In step b) the soluble salt of the metal of group VI can be acetate, oxalate or ammonium salts. A preferred aspect is to operate in the presence of formamide (Drying Control Chemical Agent) which favours the stabilization of the porous structure during the drying phase.

The quantities of the reagents are selected in relation to the composition of the final catalyst.

In step c), according to the preferred sequence, the solution from step b) is added to the suspension of step a).

In step d) the so obtained gel is maintained at a temperature from 10° to 40° C., for a time ranging from 15 to 25 h.

Step e) is carried out at a temperature ranging from 80 to 120° C.

Step f) is carried out at a temperature ranging from 400 to 600° C.

The catalysts containing zeolite of FER type, as component A, prepared according to the sol-gel method, are new, show the lowest losses of RON and MON compared with the catalysts having the same composition prepared according to the known techniques and are a further aspect of the present invention.

When a catalyst containing both zeolite and phosphorous is used in the process of the present invention, it can be prepared either using the above sol-gel procedure where in the step b) the aqueous solution also contains $H_3PO_4$, or by impregnation of the catalyst obtained from step f) with an aqueous solution of $H_3PO_4$.

Another particularly preferred aspect of the process of the present invention is to use a catalyst with zeolite FER as component A prepared by:
a) impregnation of metal oxide carrier with an aqueous solution of metal of group VIII and an aqueous solution of metal of group VI,
b) drying and calcination of the material resulting from step a),
c) mixing the impregnated metal oxide obtained from step b) with the zeolite of FER type.

The quantities of reagents are selected in relation to the composition of the final catalyst.

The impregnations of step a) are carried out with any conventional method. Between the impregnations a step of drying and calcination can be performed. Before the step c) the impregnated metal oxide can be crushed and sieved in particles of<0.2 mm and then, in step c), mixed with the zeolite by physical mixture or by dispersing the particles in an organic solvent such as cyclohexane or cyclohexanol. The solvent is vaporized and the catalyst particles dried and calcined. The mixing of step c) can be also carried out by mixing and homogenizing a solid mixture comprising the impregnated metal oxide (of particle size<0.2 mm ), the zeolite, a binder and optionally combustible organic polymers. The mixture so obtained can be kneaded with a peptizing acid solution, extruded, dried and calcined by any conventional method. Alternatively, the paste can be pelletized, dried and calcined by any conventional method.

When a catalyst containing both zeolite and phosphorous is used in the process of the present invention, it can be prepared using the above mixing procedure where in the step a) the metal oxide carrier is first impregnated with an aqueous solution of $H_3PO_4$ and then is impregnated with an aqueous solution of metal of group VIII and an aqueous solution of metal of group VI.

The catalysts which comprise a metal of group VIII, a metal of group VI, a metal oxide as carrier, a zeolite of the FER type, in a quantity ranging from 5 to 30% by weight with respect to the total weight of the catalyst, and phosphorous in a quantity ranging from 0.1 to 10%, preferably from 1 to 5% wt, are new and are another aspect of the present invention.

When the catalyst used in the process of the present invention contains only phosphorous, from 0.1 to 10% by weight with respect to the total weight of the catalyst, preferably from 1 to 5% wt, it is obtained with one of the following methods of preparation:

1) by impregnation of the metal oxide carrier with an aqueous solution of $H_3PO_4$ followed by impregnation with an aqueous solution of the metal of group VIII and an aqueous solution of the metal of group VI, or
2) by drying and calcination of a gel obtained mixing an alcohol dispersion containing a soluble salt of the metal of group VIII and an organic source of aluminum with an aqueous solution containing a soluble salt of the metal of group VI and $H_3PO4$, or
3) by impregnation with an aqueous solution of $H_3PO_4$ of a gel, dried and calcined, obtained mixing an alcohol dispersion containing a soluble salt of the metal of group VIII and an organic source of aluminum with an aqueous solution containing a soluble salt of the metal of group VI.

In the first preparation the impregnations are carried out with any conventional method. Preferably the metal oxide carrier has a surface area lower than 240 $m^2/g$. Between the impregnation with phosphoric acid and the impregnation with the metals drying and calcination are carried out.

In the second and third preparations, the conditions and quantities of sol-gel technique are used, as those above described in the sol-gel preparation of the catalyst containing zeolite FER as component A.

The catalysts used in the process of the present invention only containing phosphorous as component A, from 0.1 to 10% wt, obtained with one of the above three methods, are new and are another aspect of the present invention.

The catalysts used in the process of the present invention can be used as such or, preferably, extruded according to the known techniques, i.e. using a binder, as pseudobohemite, and a peptizing agent, as acetic acid solution, added to the catalyst to produce an estrudable paste.

In particular when the catalysts are prepared by sol-gel, there is not need to add a binder during the extrusion process.

The hydrodesulfurization process of the present invention is carried out at a temperature ranging from 220 to 340° C., preferably from 220 to 330° C., at a pressure ranging from 5 to 20 $Kg/cm^2$, at a LHSV ranging from 1 to 10 $h^{-1}$. The hydrogen is used in a quantity ranging from 100 to 500 times with respect to the hydrocarbons present (Nl/l). The hydrocarbon mixtures which can be desulfurized according to the process of the present invention contain more than 150 ppm of sulfur. For example hydrocarbon mixtures with a sulfur content higher than 1000 ppm, even higher than 10000 ppm can be subjected to hydrodesulfurization. The hydrocarbon mixture which is preferably subjected to hydrodesulfurization according to the process of the present invention consists of hydrocarbons boiling in the naphtha range deriving from cracking or coking processes. In the following examples catalysts preparations are reported, and upgrading tests either on a model feed or on a full range FCC naphtha.

EXAMPLE 1

In this example a catalyst containing Co, Mo, alumina and ZSM-35 is prepared by sol-gel procedure.

0.88 g. of $Co(NO_3)_2 \times 6H_2O$ are dissolved in 33.55 grams of butanol, at room temperature, in a beaker, under stirring. 0.99 g. of ZSM-35 (prepared according to U.S. Pat. No. 4,016,245), in acidic form, having the following characteristics: $(Si/Al)_{mol}$=13.8; Na(g/Kg zeolite)=0.1; Surface area=490 $m^2/g$; Pore volume=0.235 $cm^3/g$, are dispersed in this alcohol solution. 28.17 g. of aluminum sec-butoxide $Al(C_4H_9O)_3$ are added to the suspension thus obtained, heating for 15 minutes under stirring, to 80° C. A second solution is prepared by dissolving 1.28 g. of $(NH_4)$ $_6Mo_7O_{24} \times 4H_2O$ in 8.86 g. of distilled water, at room temperature, under stirring, for about 5 minutes; 1.38 g. of formamide are then added and the mixture is heated to 80° C. for 5 minutes.

This solution is poured into the suspension previously prepared, under heating and under stirring; a gel is obtained which is maintained at 80° C. for 1 hour, under stirring. The pH in gelation phase is controlled (about 7), to guarantee the stability of the crystalline structure of the zeolitic component. After aging for 22 hours in a beaker at room temperature, the product is dried under vacuum at 100° C. for 6 hours and is then calcined in a muffle furnace up to 550° C. for 3 hours. The composition and characteristics of the obtained catalyst are indicated in Table 1.

EXAMPLE 2

This catalyst is prepared according to the previous example, except that Co content is higher.

2.51 g. of $Co(NO_3)_2.6H_2O$ are dissolved in 33.55 grams of butanol, at room temperature, in a beaker, under stirring. 0.79 g. of ZSM-35 having the same characteristics as that cited in example 1, are dispersed in this alcohol solution. 28.07 g. of aluminum sec-butoxide $Al(C_4H_9O)_3$ are added to the suspension thus obtained, heating for 15 minutes under stirring, to 80° C.

A second solution is prepared by dissolving 1.54 g. of $(NH_4)_6Mo_7O_{24}.4H_2O$ in 8.33 g. of distilled water, at room temperature, under stirring, for about 5 minutes; 1.35 g. of formamide are then added and the mixture is heated to 80° C. for 5 minutes. Then the catalyst is treated as in the Ex.1.

The composition and characteristics of the obtained catalyst are indicated in Table 1.

EXAMPLE 3

In this example a catalyst containing Co, Mo, alumina and ZSM-35 is prepared by sol-gel procedure.

1.11 g. of $Co(NO_3)_2.6H_2O$ are dissolved in 31.05 grams of butanol, at room temperature, in a beaker, under stirring. 3 g. of ZSM-35, having the same characteristics as in previous examples, are dispersed in this alcohol solution.

26.835 g of aluminum sec-butoxide $Al(C_4H_9O)_3$ are added to the suspension thus obtained, heating for 15 minutes under stirring to 80° C.

A second solution is prepared by dissolving 1.6 g. of $(NH_4)_6Mo_7O_{24}.4H_2O$ in 8.2 g. of distilled water, at room temperature, under stirring, for about 5 minutes; 1.29 g. of formamide are then added and the mixture is heated to 80° C. for 5 minutes. Then the catalyst is treated as in the Ex.1.

The composition and characteristics of the obtained catalyst are indicated in Table 1.

EXAMPLE 4

In this example a catalyst containing Co, Mo, alumina, ZSM-35 and P is prepared.

The catalyst is prepared according to the sol-gel procedure of Ex.3. After the calcination, the catalyst is impregnated with 0.89 g of phosphoric acid (85%), followed by digestion, drying and calcination up to 550° C. for 3 hours.

The composition and characteristics of the obtained catalyst are indicated in Table 1.

EXAMPLE 5

Comparative

A comparative catalyst containing Cobalt and Molybdenum oxides, according to prior art hydrotreating catalysts, is prepared by a typical procedure of impregnation of γ-Alumina support.

227 grams of pseudoboehmite (Versal 250, LaRoche Chemicals) are mixed with 15 grams of microcristalline cellulose (Avicel, PH-101). This mixture of solids is kneaded for one hour with an acid solution prepared by solving 12.5 grams of $Al(NO_3)_3.9H_2O$ in 247.14 grams of distilled water. The resulting paste is extruded and the extrudates are dried at room temperature and then calcined at 700° C. for 4 hours.

Previous to impregnation the extrudates are crushed and sieved up to a particle size of 0.2–0.3 mm. 10.46 grams of this support are impregnated with 15 ml of a solution of Amonium heptamolibdate (AHM) plus 2.5 ml of distilled water. The AHM solution is prepared by solving 13.8 g of $(NH_4)_6Mo_7O_{24}.4H_2O$ in distilled water, adjusting the pH to 7 (aprox.) with $NH_4OH$ and adding water up to 50 ml. The impregnation is done at room temperature for one hour. Then the sample is vacuum dried for one hour at 60° C. and calcined at 300° C. for 2 hours. 13.12 grams of this sample are impregnated with 7.7 ml of a Cobalt solution plus 10.7 ml of distilled water. 50 ml of Cobalt solution are prepared by solving 18 g of $Co(NO_3)_2.6H_2O$ in distilled water. The impregnation is done at room temperature for one hour. Then, the sample is vacuum dried for one hour at 60° C. and calcined at 500° C. for 4 hours. The composition and characteristics of the obtained catalyst are indicated in Table 1.

EXAMPLE 6

Comparative

This comparative catalyst is a commercially available catalyst containing cobalt, molibdenum, phosphorous and γ-$Al_2O_3$, in quantities indicated in Table 1.

EXAMPLE 7

In this example a catalyst containing Co, Mo, alumina and phosphorous is prepared by impregnation technique.

In particular 3 catalysts have been prepared, either with γ-Alumina at different surface area or by different way of including P. The γ-Alumina support is generally prepared according to the procedure described in EXAMPLE 5.

Case a):

The γ-Alumina of this preparation has a low surface area equal to 220 m²/g. 15 grams of this support (crushed and sieved at 0.2–0.3 mm) are impregnated in excess. 100 ml of impregnating solution contains 7.5 g of $H_3PO_4$ (85%) and distilled water. The product is filtered and dried at 120° C. overnight, and then calcined at 700° C. for four hours. 4.35 grams of the P impregnated support are impregnated with 6 ml of a AHM solution plus 1.3 ml of distilled water for one hour. The AHM solution is prepared by solving 27.6 g of $(NH_4)_6Mo_7O_{24}.4H_2O$ in distilled water, adjusting the pH to 7 (aprox.) with $NH_4OH$ and adding water up to 100 ml. The impregnation is done at room temperature for one hour. Then the sample is vacuum dried for one hour at 60° C. and calcined at 300° C. for 2 hours. 5.69 grams of this sample are impregnated with 5.3 ml of a Cobalt solution plus 2.7 ml of water for one hour. 50 ml of Cobalt solution are prepared by solving 11 g of $Co(NO_3)_2.6H_2O$ in distilled water. The impregnation is done at room temperature for one hour. Then, the sample is vacuum dried for one hour at 60° C. and calcined at 500° C. for 4 hours.

Case b):

The catalyst has been prepared as in the above procedure except that the alumina support has been calcined at 500° C.

for 4 hours and that after the impregnation with $H_3PO_4$ the sample has been calcined at 500° C. for 4 hours. Then the impregnation with Mo and Co solutions was as above. The alumina of this preparation has a high surface area equal to 295 m²/g.

Case c):

This catalyst has the same chemical formulation as the previous ones. The difference is that P has been included during the extrusion of alumina. In particular the alumina has been prepared starting with a paste of 646 g of pseudobohemite (Versal 250) and 42 g of cellulose (Avicel PH-101) added with an acidic solution obtained from 35.2 g of $Al(NO_3)_3$ hyd. and 66 g of $H_3PO_4$ (85%) in 610 g of water. Extrusion and calcination have been performed as in EXAMPLE 5. Such support has a surface area equal to 280 m²/g. The same impregnation with Mo and Co solution were followed.

The composition and characteristics of the 3 catalysts are indicated in Table 1.

EXAMPLE 8

In this example a catalyst containing Co, Mo, alumina and ZSM-35 is prepared by. impregnation tecnique.

139.24 grams of pseudoboehmite (Versal 250, LaRoche Chemicals) are mixed with 13.73 grams of ZSM-35 of ex.1, and 13.92 grams of hydroxyethyl-cellulose (HEC 15000H, BP). This mixture of solids is kneaded for one hour with 183.1 grams of an acid solution prepared by solving 2.66 grams of $HNO_3$ (62.7%) in 180.44 grams of distilled water. The resulting paste is extruded and the extrudates are dried at room temperature and then calcined at 600° C. for 4 hours.

Previous to impregnation the extrudates are crushed and sieved up to a particle size of 0.2–0.3 mm. 9.18 grams of this support are impregnated with 8.4 ml of a solution of AHM plus 7 ml of distilled water. The AHM solution is prepared by solving 21.68 g of $(NH_4)_6Mo_7O_{24}.4H_2O$ in distilled water, adjusting the pH to 7 (aprox.) with $NH_4OH$ and adding distilled water up to 100 ml. The impregnation is done at room temperature for one hour. Then the sample is vacuum dried for one hour at 60° C. and calcined at 300° C. for 2 hours. 10.32 grams of this sample are impregnated with 6.19 ml of a Cobalt solution plus 8.26 ml of water. 50 ml of Cobalt solution are prepared by solving 10 g of $Co(NO_3)_2.6H_2O$ in water. The impregnation was done at room temperature for one hour. Then, the sample is vacuum dried for one hour at 60° C. and calcined at 500° C. for 4 hours. The composition and characteristics of the obtained catalyst is reported in Table 1.

EXAMPLE 9

A catalyst containing Cobalt, Molybdenum, γ-Alumina and ZSM-35 is prepared by physical mixture of ZSM-35 and a catalyst containing Co, Mo and γ-alumina. Such catalyst is prepared following the procedure shown in EXAMPLE 5. Then this catalyst is physically mixed with ZSM-35 of ex.1 (10% by weight)and calcined. The so obtained mixture is pelletized, crushed and sieved. The composition and characteristics of the catalyst is reported in Table 1.

EXAMPLE 10

A catalyst containing Cobalt, Molybdenum, γ-Alumina and 30 wt % ZSM-35 is prepared by physical mixture of ZSM-35 and a catalyst containing Co, Mo and γ-alumina following the procedure shown in EXAMPLE 9.

12.66 grams of γ-Alumina support, prepared as described in EXAMPLE 5, are impregnated with 21 ml of AHM solution, prepared by solving 35.1 g of $(NH_4)_6Mo_7O_{24}.4H_2O$ in distilled water, adjusting the pH to 7 (aprox.) with $NH_4OH$ and adding distilled water up to 100 ml. The impregnation is done at room temperature for one hour. Then the sample is vacuum dried for one hour at 60° C. and calcined at 300° C. for 2 hours. 16.9 grams of this sample are impregnated with 23.6 ml of a Cobalt solution. 50 ml of Cobalt solution were prepared by solving 10 g of $Co(NO_3)_2.6H_2O$ in distilled water. The impregnation is done at room temperature for one hour. Then, the sample is vacuum dried for one hour at 60° C. and calcined at 500° C. for 4 hours. The physical mixture of this catalyst and ZSM-35 of ex.1 is carried out as shown in EXAMPLE 9.

The composition and characteristics of the obtained catalyst are reported in Table 1.

EXAMPLE 11

This Example is to show the preparation of a catalyst containing Co, Mo, γ-$Al_2O_3$, phosphorous and ZSM-35. The catalyst is prepared by mixing an already prepared catalyst containing Co, mo, P and γ-$Al_2O_3$ with ZSM-35 of ex.1. The catalyst containing Co,Mo, P and γ-$Al_2O_3$ is prepared following the method described in EXAMPLE 7 case a). Then this catalyst is mixed with ZSM-35 as described in EXAMPLE 9. The composition and characteristics of the obtained catalyst is reported in Table 1.

TABLE 1

|  | 1 | 2 | 3 | 4 | 5($) | 6($$) | 7 a) | b) | c) | 8 | 9 | 10 | 11 |
|---|---|---|---|---|---|---|---|---|---|---|---|---|---|
| Co (wt %) | 2.3 | 6 | 2.2 | 2.1 | 3.78 | 3.5 | 3.8 | 3.8 | 4 | 2.32 | 3.42 | 3.47 | 3.21 |
| Mo (wt %) | 8.6 | 9.9 | 8.6 | 7.8 | 15.3 | 12.8 | 13.6 | 13.9 | 15 | 8.93 | 13.8 | 13.2 | 11.2 |
| Co/Mo | 0.45 | 1 | 0.43 | 0.45 | 0.40 | 0.44 | 0.45 | 0.45 | 0.45 | 0.42 | 0.40 | 0.43 | 0.47 |
| Zeol. (wt %) | 10.1 | 7.95 | 29.55 | 29.6 | — | — | — | — | — | 10 | 10 | 30 | 10 |
| Al2O3 wt % | 71.8 | 67.85 | 56.1 | 55 | 72.2 | 69.8 | 69.4 | 69 | 65 | 73.6 | 64.9 | 45.7 | 61.9 |
| P (wt %) | — | — | — | 2.4 | — | 2.84 | 3.5 | 3.7 | 2.5 | — | — | — | 3.13 |
| Surf. area (m2/g) | 315 | 300 | 460 | 310 | 171 | 156 (!) | 137 | 150 | 186 | 281 (!) | 171 (!!) | 148 (!!) | 137 |
| Pore Vol. (cm3/g) | 0.92 | 0.78 | 1.11 | 0.85 | 0.64 | 0.44 | 0.51 | 0.51 | 0.57 | 0.64 (!) | 0.64 (!!) | 0.59 (!!) | 0.51 (!!) |

($) Comparative catalyst;
($$) Comparative commercial catalyst. Also tested with full range FCC naphtha;
(!) values are of extrudates;
(!!) values are of catalyst before mixing with zeolite

EXAMPLE 12

Extruded Catalyst 8.9 g. of $Co(NO_3)_2.6H_2O$ are dissolved in 335.6 grams of butanol, at room temperature, in a beaker, under stirring. 6.5 g. of ZSM-35, in acidic form, having the following characteristics: $(Si/Al)_{mol}$=12.7; Na(g/Kg zeolite)=0.06; Surface area=470 $m^2$/g; Pore volume=0.23 $cm^3$/g. are dispersed in this alcohol solution.

276.3 g. of aluminum sec-butoxide $Al(C_4H_9O)_3$ are added to the suspension thus obtained, heating for 15 minutes under stirring, to 80° C.

A second solution is prepared by dissolving 13 g. of $(NH_4)_6Mo_7O_{24}.4H_2O$ in 82.9 g. of distilled water, at room temperature, under stirring, for about 5 minutes; 13.6 g. of formamide are then added and the mixture is heated to 80° C. for 5 minutes.

This solution is poured into the suspension previously prepared, under heating and under stirring; a gel is obtained which is maintained at 80° C. for 1 hour, under stirring. The pH in gelation phase is controlled (about 7), to guarantee the stability of the crystalline structure of the zeolitic component. After aging for 21 hours in a beaker at room temperature, the product is dried on a heating plate, under a stream of $N_2$.

60 grams of the catalyst thus dried are mixed with 40 grams of an aqueous solution of acetic acid (4%), kneaded and extruded. The extruded product is dried for a night in a vacuum oven at 100° C. and is calcined in a muffle furnace up to 550° C. for 3 hours. The composition and characteristics of the extruded catalyst is reported in Table 2.

EXAMPLE 13

Comparative

A catalyst is prepared following the same procedure as described in patent U.S. Pat. No. 5,378,352. The zeolite used is ZSM-35 of ex.12 instead of MCM-22 employed in the mentioned patent.

43.93 grams of pseudoboehmite (Versal 250, LaRoche Chemicals) are mixed with 109.52 g of ZSM-35 and 14 grams of hydroxyethyl cellulose (HEC 15000H, BP) The solid is kneaded with an acid solution obtained by solving 0.841 grams of $HNO_3$ (62.7%) in 181.69 grams of distilled water. The paste so formed is extruded. These extrudates are dried at room temperature and calcined at 600° C. during 4 hours.

The extrudates are impregnated in excess with an AHM solution that contains 370 grams of $(NH_4)_6Mo_7O_{24}.4H_2O$ per litre of solution for one hour. The impregnation is carried out in ammoniacal pH. Then the catalyst is drained and dried in circulating air at 90° C. Then the sample is calcined at 500° C. during 4 hours. The extrudates are then impregnated in excess with a solution of Cobalt that contains 260 g of $Co(NO_3)_2.6H_2O$ per litre of solution during one hour, at the natural pH of the solution. Then, the extrudates are drained and dried at 90° C. for one hour and calcined at 500° C. during 4 hours. Composition and characteristics of the extruded catalyst are described in Table 2.

EXAMPLE 14

A catalyst is prepared following the same procedure as described in example 13, containing 9.82 wt % of ZSM-35 instead of 55 wt % on catalyst weight basis. The composition and characteristics of the catalysts are reported in Table 2.

EXAMPLE 15

A γ-Alumina is prepared according to example 5. The Γ-alumina calcined extrudates are then impregnated in excess with a solution that contains 75 grams of $H_3PO_4$ (85%) per litre of aqueous solution. The extrudates are then drained, dried in air and calcined at 700° C. for 4 hours. Then the extrudates are impregnated in excess first with AHM and then with Cobalt nitrate as shown in EXAMPLE 13. Drying and calcination method are also as in EXAMPLE 13. The composition and characteristics of the catalysts are riported in Table 2.

EXAMPLE 16

A γ-Alumina support is prepared as described in EXAMPLE 5. The support is crushed and sieved at a particle diameter<0.2 mm. This support is impregnated as shown in EXAMPLE 5. 9.31 grams of this $CoMo/\gamma-Al_2O_3$ catalyst are mixed with 3.86 grams of ZSM-35 of ex 12, 1.243 grams of hydroxyethyl cellulose (HEC 15000H, BP Chemicals)) and 8.87 grams of pseudoboehmite V700 (LaRoche Chemicals). This mixture is kneaded with an acid solution that contains 0.54 grams of $HNO_3$ (62.7%) in 21.96 grams of distilled water. The resulting paste is extruded and the extrudates are dried at room temperature and calcined at 500° C. during 4 hours. The composition and characteristics of the catalysts are riported in Table 2.

EXAMPLE 17

A γ-Alumina support is prepared as shown in EXAMPLE 5. The support is crushed and sieved at a particle diameter <0.2 mm. This support is impregnated as shown in EXAMPLE 7 case a). 9.31 grams of this $CoMoP/\gamma-Al_2O_3$ catalyst are mixed with 3.99 grams of ZSM-35 of ex.12, 1.11 grams of hydroxyethyl cellulose (HEC 15000H, BP Chemicals) and 8.87 grams of pseudoboehmite V700 (LaRoche Chemicals). This solid mixture is kneaded with an acid solution that contains 0.54 grams of $HNO_3$ (62.7%) in 21.96 grams of distilled water. The resulting paste is extruded and the extrudates are dried at room temperature and calcined at 500° C. during 4 hours. The composition and characteristics of the catalysts are riported in Table 2.

TABLE 2

| | EXAMPLE | | | | | |
|---|---|---|---|---|---|---|
| | 12 | 13 ($) | 14 | 15 | 16 | 17 |
| Co (wt %) | 2.2 | 3.08 | 2.8 | 3.47 | 1.87 | 1.77 |
| Mo (wt %) | 8.9 | 7.93 | 9.3 | 6.97 | 7.08 | 6.7 |
| Co/Mo | 0.41 | 0.63 | 0.49 | 0.81 | 0.43 | 0.43 |
| Zeol. (wt %) | 10 | 55 | 9.82 | — | 19.84 | 20.37 |

TABLE 2-continued

|  | EXAMPLE | | | | | |
| --- | --- | --- | --- | --- | --- | --- |
|  | 12 | 13 ($) | 14 | 15 | 16 | 17 |
| $Al_2O_3$ wt % | 72 | 29.04 | 72.67 | 77.84 | 67.16 | 63.47 |
| P (wt %) | — | — | — | 3.18 | — | 1.66 |
| Surf.Area $m^2/g$ | 315 | 303 | 281 | 157 | 302 | 270 |
| Pore Vol ($cm^3/g$) | 0.63 | 0.56** | 0.46** | 0.61** | 0.75** | 0.67** |

($) Comparative catalyst;
** Hg

EXAMPLE 18

Test on Model Feed 1 g of the catalyst of EXAMPLE 1 is charged in a reactor and activated in the presence of $H_2S$ (10% vol in $H_2$) up to 400° C. A mixture, representative of olefinic naphtha composition, is then fed consisting of thiophene (corresponding to 1000 ppm of S), 1-pentene (30% w) and the rest n-hexane at WHSV=5 $h^{-1}$, Ptot=10 bars and $H_2$/HC ratio 100 (std l/l )

The temperature varies from 200 to 300° C. At each temperature the full product composition is analyzed by gas chromatography. Table 3 indicates the conversion values in HDS and the conversion in ISO %, wherein the conversion in HDS hydrodesulfuration is calculated as:

HDS %=100*(thiophene$_{in}$-thiophene$_{out}$)/thiophene$_{in}$

ISO %=Mole % of branched products (olefins+paraffines) in $C_5$ fraction

HYD %=((Moles 1-pentene$_{(in)}$-Σmoles pentene$_{(out)}$)/Moles 1-pentene$_{(in)}$)*100.

The higher the ISO %, the higher will be also the octane number (both as RON and MON), since i-paraffines and, especially i-olefines, have higher octane numbers than their correspondent normal hydrocarbons.

EXAMPLE 19

1 gram of the catalyst of EXAMPLE 2 is activated as described in EXAMPLE 18. It is then used in the HDS reaction as in EXAMPLE 18. The results are reported in Table 3. The increase in the cobalt content favours the hydrogenating capacity with respect to the catalyst of EXAMPLE 1.

EXAMPLE 20

1 gram of the catalyst of EXAMPLE 3 is treated as in EXAMPLE 18 and is then subjected to HDS reaction as in the above example. The results are reported in Table 3. This catalyst shows higher catalytic activity with respect to the catalyst of EXAMPLE 1.

EXAMPLE 21

1 gram of the catalyst of EXAMPLE 4 is treated as in EXAMPLE 18 and is then subjected to HDS reaction as in the above example. The results are reported in Table 3. The presence of P and ZSM-35 decreases the olefin hydrogenation while maintaining olefin isomerization.

EXAMPLE 22

Comparative 1 g of catalyst of EXAMPLE 5 was tested in a continuous flow standard hydrodesulfurization reactor as in EXAMPLE 18, except that LHSV was 5 $h^{-1}$ and the ratio hydrogen/hydrocarbon was 300 Nl/l. The results are reported in Table 3. The isomerization activity of such catalyst is very low.

EXAMPLE 23

Comparative 1 gram of the catalyst of EXAMPLE 6 is charged in the reactor and activated as described in EXAMPLE 22. Then, it is used in the reaction trials following the procedure of EXAMPLE 22. The results are reported in Table 3. This commercial catalyst shows a similar hydrogenation and isomerization activity than the comparative catalyst of EXAMPLE 22. Consequently, both comparative catalysts produce the same results in terms of HDS/HYD ratio and isomerization.

EXAMPLE 24

Each catalyst of EXAMPLE 7, case a) to c) has been tested as described in EXAMPLE 22. The results are reported in Table 3. The presence of phosphorous as in case a) produces a large decrease in the hydrogenation capability of this catalyst in respect to the comparative catalyst of Ex. 6, tested in Ex. 23. This lower extent of hydrogenation will imply lower n-paraffin formation. The catalyst of case b) prepared from a support with high surface area produces higher hydrogenation activity than the catalyst of case a). The catalyst of case c), prepared with P included during the formulation of the support doesn't produce lower hydrogenation capacity. So when P is included in the composition of the catalyst by impregnation, to minimize the olefin hydrogenation, is better to impregnate a support with low surface area.

EXAMPLE 25

1 gram of the catalyst of Example 8 is charged in the reactor and activated as described in Example 22. Then, it is used in the reaction trials following the procedure of Example 22. The results are reported in Table 3. The extent of isomerization is increased when ZSM-35 is included in the support and the catalyst is then prepared by impregnation, as described in Example 8 in respect to the comparative catalysts of Ex. 5 and 6, even if the isomerization is lower than in case of catalyst prepared by sol-gel, with the same composition (Ex.1).

EXAMPLE 26

1 gram of the catalyst of Example 9 is charged in the reactor and activated as described in Example 22. Then, it is used in the reaction trials following the procedure of Example 22. The results are reported in Table 3. If ZSM-35 is included in the catalyst formulation by mechanical mixing, as described in Example 9, increases the isomerization activity in respect to the catalyst of Ex. 8.

EXAMPLE 27

1 gram of the catalyst of Example 10 is charged in the reactor and activated as described in Example 22. Then, it is used in the reaction trials following the procedure of Example 22. The results are reported in Table 3. The increase in ZSM-35 content, when the catalyst is produced according to Example 10 produces an increase in isomerization and a decrease in hydrogenation, showing improved performance with respect to the comparative catalysts (Examples 5, 6, 22 and 23)

EXAMPLE 28

1 gram of the catalyst of Example 11 is charged in the reactor and activated as described in Example 22. Then, it is used in the reaction trials following the procedure of Example 22. The results are reported in Table 3. This example shows a large increase in isomerization and a large decrease in hydrogenation activity. The simultaneous inclusion of phosphorous and ZSM-35 gives a clear improvement in the catalyst performance, that will give a product with higher octane number. This catalyst shows largely improved performance with respect to the comparative catalysts (Examples 5, 6, 22 and 23).

TABLE 3

| EXAMPLE | CATALYST | TEMP., °C. | HDS, % | HYD, % | ISO, % |
|---|---|---|---|---|---|
| 18 | Ex. 1 | 250 | 43 | 29 | 35 |
|  |  | 280 | 81.6 | 57.9 | 64.1 |
| 19 | Ex. 2 | 250 | 51.4 | 27.5 | 22.6 |
|  |  | 280 | 90.6 | 66.2 | 58.12 |
| 20 | Ex. 3 | 250 | 81.4 | 47.6 | 64.3 |
|  |  | 280 | 99.3 | 92.9 | 63.7 |
| 21 | Ex. 4 | 250 | 79.5 | 32.3 | 33.6 |
|  |  | 280 | 98.5 | 79.5 | 54.2 |
| 22 | Ex. 5 | 250 | 90.9 | 45.3 | 3.96 |
|  |  | 280 | 100 | 97.6 | 2.33 |
| 23 | Ex 6 | 240 | 91.60 | 43.83 | 2.95 |
|  |  | 260 | 100.00 | 86.16 | 3.26 |
| 24 | Ex. 7 case a | 250 | 95.84 | 30.62 | 3.13 |
|  |  | 280 | 100 | 74.84 | 3.89 |
|  | case b | 225 | 73.51 | 28.48 | 3.24 |
|  |  | 250 | 98.93 | 81.98 | 4.52 |
|  | case c | 225 | 87.52 | 41.06 | 2.82 |
|  |  | 250 | 100 | 90.22 | 3.10 |
| 25 | Ex. 8 | 240 | 87.82 | 52.15 | 6.25 |
|  |  | 250 | 98.94 | 72.52 | 10.59 |
|  |  | 280 | 100 | 99.22 | 23.76 |
| 26 | Ex. 9 | 245 | 67.13 | 31.10 | 22.69 |
|  |  | 270 | 100.00 | 65.00 | 54.95 |
| 27 | Ex. 10 | 230 | 24.80 | 7.22 | 48.79 |
|  |  | 260 | 85.04 | 23.21 | 77.97 |
|  |  | 270 | 93.97 | 36.68 | 77.06 |
| 28 | Ex. 11 | 260 | 71.94 | 16.8 | 66.08 |
|  |  | 270 | 92.62 | 24.37 | 72.00 |

Examples of Upgrading of Full Range FCC Naphtha

In the following series of experiments catalysts of EXAMPLES 12 to 17 are tested in a continuous flow reactor for desulfurization of full range FCC naphtha. Also, the reference commercial catalyst of EXAMPLE 6 is tested. The composition of full range FCC naphtha is reported in Table 4.

The objective of these examples is to determine the extent of octane loss observed during the desulfurization process.

The tests are carried out at the following conditions:
$250° < T < 340°$ C.; $5 < P_{H2} < 20$ atm;
$100 < H_2$/hydrocarbon feed $< 500$ Nl/l.

TABLE 4

Composition of full range FCC naphtha

| PRODUCT CHARACTERISTICS | standard | FEED |
|---|---|---|
| Density a 15° C. kg/l | ASTM D-1298 | 0.7466 |
| Sulfur, ppm | ASTM D-5453 | 2390 |
| Nitrogen, ppm | ASTM D-4629 | 58 |
| Bromine No | ASTM D-1159 | 55.6 |
| Dyene Index | UOP-326 | 1.42 |
| Analisys PIONA (% wt): |  |  |
| naphtenes |  | 6.72 |
| i-paraffins |  | 21.05 |
| n-paraffins |  | 3.37 |
| cycl- olefines |  | 3.23 |
| i-olefines |  | 17.22 |
| n-olefines |  | 9.12 |
| aromatics |  | 30.91 |
| >200° C. |  | 8.22 |
| RON | ASTM D-2699 | 91.4 |
| MON | ASTM D-2700 | 80.5 |
| Distillation Curve | ASTM D-86 |  |
| PI |  | 35 |
| 5% |  | 46 |
| 10% |  | 52 |
| 20% |  | 53 |
| 30% |  | 74 |
| 40% |  | 90 |
| 50% |  | 109 |
| 60% |  | 129 |
| 70% |  | 151 |
| 80% |  | 172 |
| 90% |  | 195 |
| 95% |  | 207 |
| PF |  | 217 |

EXAMPLE 29

Comparative

In this comparative example 25 cm$^3$ of catalyst of Example 6 are placed in the reactor. The catalyst is treated in air increasing the temperature at 5° C./min up to 400° C., and it is maintained at this temperature for 2 hours. The catalyst is brought to room temperature overnight. Then a flow of 0.450 Nl/min of a mixture of 95% H$_2$ and 5% H$_2$S is passed through the reactor. The temperature is increased up to 320° C. at 3° C./min, and this temperature is maintained for two hours. Then the temperature is increased up to 400° C. at 2° C./min and it is maintained for one hour. Then the reactor temperature is set at 360° C. overnight. The conditions used for the desulfurization process are:
Hydrogen pressure: 10 kg/cm$^2$, Liquid space velocity: 4 h$^{-1}$;
Hydrogen/Hydrocarbon ratio: 400 Nl/l;
Temperature: 260–300° C.
Table 5 shows the results of the tests.

TABLE 5

Results Example 29

| Catalyst Example 6 | | FEED | | | | |
|---|---|---|---|---|---|---|
| CONDITIONS | | | | | | |
| Temperature, ° C. | | | 260 | 270 | 280 | 300 |
| Pressure, kg/cm2 | | | 10 | 10 | 10 | 10 |
| LHSV, h-1 | | | 4 | 4 | 4 | 4 |
| Ratio H2/HC, Nl/l | | | 400 | 400 | 400 | 400 |
| PRODUCT CHARACTERISTICS | | | | | | |
| Sulfur, ppm | ASTM D-5453 | 2390 | 414 | 303 | 164 | 101 |
| Bromine No | ASTM D-1159 | 55.6 | 43.9 | 40.3 | 30.8 | 19.0 |
| Analisys PIONA (% wt): | | | | | | |
| naphtenes | | 6.72 | 9.1 | 9.4 | 10.0 | 10.7 |
| i-paraffins | | 21.05 | 25.5 | 27.0 | 29.4 | 34.2 |
| n-paraffins | | 3.37 | 4.1 | 5.0 | 5.8 | 8.3 |
| cycl-olefines | | 3.32 | 2.6 | 2.3 | 1.7 | 1.1 |
| i-olefines | | 17.22 | 10.7 | 10.1 | 7.5 | 4.8 |
| n-olefines | | 9.13 | 4.7 | 4.5 | 2.8 | 1.9 |
| aromatics | | 30.91 | 32.8 | 31.5 | 31.8 | 29.7 |
| >200° C. | | 8.22 | 10.5 | 10.2 | 11.0 | 11.0 |
| RON | ASTM D-2699 | 91.4 | | 89.0 | 86.0 | 82.8 |
| MON | ASTM D-2700 | 80.5 | | 79.4 | 78.4 | 76.9 |

While decreasing the S content there's a high decrease in both RON and MON numbers.

EXAMPLE 30

Comparative

In this Comparative example 25 cm³ of catalyst of Example 13 is placed in the reactor. The catalyst is activated following the procedure shown in Example 29. Then the desulfurization of full range FCC naphtha is carried out in the conditions described in U.S. Pat. No. 5,378,352:
Hydrogen pressure: 40 kg/cm²; Liquid space velocity: 1 h⁻¹; Hydrogen/Hydrocarbon ratio: 200 Nl/l
Temperature: 330–350° C.

TABLE 6

Results Example 30

| Catalyst Example 13 | | FEED | | | |
|---|---|---|---|---|---|
| CONDITIONS | | | | | |
| Temperature, ° C. | | | 350 | 340 | 330 |
| Pressure, kg/cm2 | | | 40 | 40 | 40 |
| LHSV, h-1 | | | 1 | 1 | 1 |
| Ratio H2/HC, Nl/l | | | 200 | 200 | 200 |
| PRODUCT CHARACTERISTICS | | | | | |
| Sulfur, ppm | ASTM D-5453 | 2390 | 42 | 100 | 170 |
| Bromine No | ASTM D-1159 | 55.6 | 1.72 | 0.7 | 2.1 |
| Analisys PIONA (% wt): | | | | | |
| naphtenes | | 8.11 | 13.1 | 13.3 | 13.0 |
| i-paraffins | | 24.53 | 38.8 | 40.2 | 39.6 |
| n-paraffins | | 3.64 | 10.5 | 11.0 | 11.1 |
| cycl-olefines | | 2.95 | 0.1 | 0.1 | 0.1 |
| i-olefines | | 13.94 | 0.6 | 0.0 | 0.2 |
| n-olefines | | 6.66 | 0.1 | 0.0 | 0.0 |
| aromatics | | 30.23 | 28.7 | 28.0 | 28.0 |
| >200° C. | | 7.91 | 8.1 | 7.5 | 7.9 |
| RON | ASTM D-2699 | 91.4 | 78 | 78 | 78.5 |
| MON | ASTM D-2700 | 80.5 | 75.2 | 75.1 | 75.3 |

The octane losses obtained are very high in all the range of temperatures tested. RON loss is in the order of 13 units and MON loss is in the order of 5 to 6 units.

EXAMPLE 31

In this example 25 cm³ of catalyst of Example 14 is placed in the reactor. The catalyst is activated following the procedure shown in Example 29. Then the desulfurization of full range FCC naphtha is carried out as described in Example 29. Table 7 shows the results of the tests.

TABLE 7

Results Example 31

| catalyst Example 14 | | FEED | | | |
|---|---|---|---|---|---|
| CONDITIONS | | | | | |
| Temperature, ° C. | | | 280 | 300 | 310 |
| Pressure, kg/cm2 | | | 10 | 10 | 10 |
| LHSV, h-1 | | | 4 | 4 | 4 |
| Ratio H2/HC, Nl/l | | | 400 | 400 | 400 |
| PRODUCT CHARACTERISTICS | | | | | |
| Sulfur, ppm | ASTM D-5453 | 2390 | 152 | 122 | 42 |
| Bromine No | ASTM D-1159 | 55.63 | 36.76 | 26.65 | 19.8 |
| Analisys PIONA (% wt): | | | | | |
| naphtenes | | 6.72 | 9.7 | 10.9 | 11.7 |
| i-paraffins | | 21.05 | 29.3 | 32.4 | 34.0 |
| n-paraffins | | 3.37 | 6.8 | 8.1 | 8.9 |
| cycl-olefines | | 3.32 | 1.8 | 1.1 | 0.6 |
| i-olefines | | 17.22 | 8.7 | 5.9 | 3.6 |
| n-olefines | | 9.13 | 4.1 | 2.6 | 1.8 |
| aromatics | | 30.91 | 31.3 | 30.0 | 30.6 |
| >200° C. | | 8.22 | 8.2 | 9.0 | 8.9 |
| RON | ASTM D-2699 | 91.4 | 86.9 | 83.6 | 82 |
| MON | ASTM D-2700 | 80.5 | 78.5 | 77.4 | 76.8 |

Octane losses are lower than with both comparative catalysts tested in Ex. 29 and 30, confirming the results obtained with synthetic feed.

EXAMPLE 32

In this example 25 cm³ of catalyst of Example 15 is placed in the reactor. The catalyst is activated following the procedure shown in Example 29. Then the desulfurization of full range FCC naphtha is carried out as described in Example 29, at the conditions of Table 8. The same Table shows the results of the tests.

TABLE 8

| | Results Example 32 | | | | |
|---|---|---|---|---|---|
| catalyst Example 15 | | FEED | | | |
| CONDITIONS | | | | | |
| Temperature, ° C. | | | 310 | 310 | 320 |
| Pressure, kg/cm2 | | | 10 | 10 | 10 |
| LHSV, h-1 | | | 4 | 1.5 | 1.5 |
| Ratio H2/HC, Nl/l | | | 400 | 400 | 400 |
| PRODUCT CHARACTERISTICS | | | | | |
| Sulfur, ppm | ASTM D-5453 | 2209 | 295 | 241 | 63 |
| Bromine No | ASTM D-1159 | 54.6 | 42.24 | 29.1 | 24.6 |
| Analisys PIONA (% wt): | | | | | |
| naphtenes | | 8.11 | | 10.2 | 10.7 |
| i-paraffins | | 24.53 | | 30.7 | 32.9 |
| n-paraffins | | 3.64 | | 6.6 | 7.4 |
| cycl-olefines | | 2.95 | | 1.7 | 1.1 |

TABLE 8-continued

| | Results Example 32 | | | | |
|---|---|---|---|---|---|
| catalyst Example 15 | | FEED | | | |
| i-olefines | | 13.94 | | 8.7 | 7.1 |
| n-olefines | | 8.66 | | 3.9 | 3.2 |
| aromatics | | 30.23 | | 30.4 | 29.8 |
| >200° C. | | 7.91 | | 7.9 | 7.7 |
| RON | ASTM D-2699 | 91.4 | 90.2 | 86.3 | 85.7 |
| MON | ASTM D-2700 | 80.5 | 80.2 | 79.0 | 78.8 |

Octane losses are lower than with both comparative catalysts tested in 29 and 30, confirming the results obtained with synthetic feed. At very low S content the extent of hydrogenation of olefines is lower than the other catalysts.

EXAMPLE 33

In this example 25 cm³ of catalyst of Example 16 is placed in the reactor. The catalyst is activated following the procedure shown in Example 29. Then the desulfurization of full range FCC naphtha is carried out as described in Example 29. Table 9 shows the results of the tests.

TABLE 9

| | Results Example 33 | | | | | |
|---|---|---|---|---|---|---|
| Catalyst Example 16 | | FEED | | | | |
| CONDITIONS | | | | | | |
| Temperature, ° C. | | | 320 | 315 | 310 | 300 | 290 |
| Pressure, kg/cm2 | | | 10 | 10 | 10 | 10 | 10 |
| LHSV, h-1 | | | 3 | 1.5 | 1.5 | 1.5 | 1.5 |
| Ratio H2/HC, Nl/l | | | 400 | 400 | 400 | 400 | 400 |
| PRODUCT CHARACTERISTICS | | | | | | | |
| Sulfur, ppm | ASTM D-5453 | 2209 | 367 | 178 | 270 | 351 | 373 |
| Bromine No | ASTM D-1159 | 54.6 | 40.97 | 33.31 | 34.8 | 41.1 | 43.2 |
| Analisys PIONA (% wt): | Oct. 3, 1998 | | | | | | |
| naphtenes | | 8.11 | 9.03 | 9.7 | 9.5 | 9.2 | 9.2 |
| i-paraffins | | 24.53 | 26.42 | 28.6 | 27.6 | 26.7 | 26.7 |
| n-paraffins | | 3.64 | 4.7 | 6.3 | 5.6 | 5.1 | 4.9 |
| cycl-olefines | | 2.95 | 2.07 | 2.3 | 2.5 | 2.6 | 2.7 |
| i-olefines | | 13.94 | 11.94 | 10.2 | 11.9 | 12.8 | 12.0 |
| n-olefines | | 8.66 | 5.94 | 4.1 | 5.1 | 5.8 | 5.8 |
| aromatics | | 30.23 | 31.61 | 31.0 | 30.1 | 30.1 | 30.4 |
| >200° C. | | 7.91 | 8.26 | 7.9 | 7.8 | 7.6 | 8.3 |
| RON | ASTM D-2699 | 91.4 | 90.0 | 87.7 | 89 | 89.6 | 89.9 |
| MON | ASTM D-2700 | 80.5 | 80.4 | 79.2 | 79.8 | 80.1 | 79.9 |

Octane losses are lower than with both comparative catalysts tested in Ex. 29 and 30, confirming the results obtained with synthetic feed.

EXAMPLE 34

In this example 25 cm³ of catalyst of Example 17 is placed in the reactor. The catalyst is activated following the procedure shown in Example 29. Then the desulfurization of full range FCC naphtha is carried out as described in Example 29. Table 10 shows the results of the tests.

TABLE 10

| CATALYST EXAMPLE 17 | | FEED | | | | |
|---|---|---|---|---|---|---|
| CONDITIONS | | | | | | |
| Temperature, ° C. | | | 320 | 312 | 304 | 296 |
| Pressure, kg/cm2 | | | 10 | 10 | 10 | 10 |
| LHSV, h-1 | | | 1.5 | 1.5 | 1.5 | 1.5 |
| Ratio H2/HC, Nl/l | | | 400 | 400 | 400 | 400 |
| PRODUCT CHARACTERISTICS | STANDARD | | | | | |
| Sulfur, ppm | ASTM D-5453 | 2209 | 63 | 130 | 204 | 230 |
| Bromine No | ASTM D-1159 | 54.6 | 18.1 | 28.3 | 35.3 | 38.5 |
| Analisys PIONA (% wt): | | | | | | |
| naphtenes | | 8.11 | 10.84 | 10.2 | | |
| i-paraffins | | 24.53 | 33.97 | 29.2 | | |
| n-paraffins | | 3.64 | 7.94 | 6.5 | | |
| cycl-olefines | | 2.95 | 0.89 | 1.7 | | |
| i-olefines | | 13.94 | 5.54 | 8.4 | | |
| n-olefines | | 6.66 | 2.08 | 3.5 | | |
| aromatics | | 30.23 | 30.86 | 31.6 | | |
| >200° C. | | 7.91 | 7.82 | 9.0 | | |
| RON | ASTM D-2699 | 91.4 | 84.0 | 86.8 | 88.4 | 88.9 |
| MON | ASTM D-2700 | 80.5 | 78.2 | 78.9 | 79.5 | 79.6 |

Octane losses are lower than with both comparative catalysts tested in Ex. 29 and 30, confirming the results obtained with synthetic feed.

EXAMPLE 35

In this example 25 cm³ of catalyst of Example 12 is placed in the reactor. The catalyst is activated following the procedure shown in Example 29. Then the desulfurization of full range FCC naphtha is carried out as described in Example 29. Table 11 shows the results of the tests.

TABLE 11

| CATALYST EXAMPLE 12 | | FEED | | | |
|---|---|---|---|---|---|
| CONDITIONS | | | | | |
| Temperature, ° C. | | | 310 | 320 | 330 |
| Pressure. kg/cm2 | | | 10 | 10 | 20 |
| LHSV, h-1 | | | 4 | 4 | 4 |
| Ratio H2/HC, Nl/l | | | 400 | 400 | 400 |
| PRODUCT CHARACTERISTICS | STANDARD | | | | |
| Sulfur, ppm | ASTM D-5453 | 2013 | 312 | 230 | 55 |
| Bromine No | ASTM D-1159 | 54.6 | 46.3 | 43.9 | 21.4 |
| Analisys PIONA (% wt): | | | | | |
| naphtenes | | 8.11 | 8.71 | 9.02 | 10.96 |
| i-paraffins | | 24.53 | 24.87 | 25.59 | 31.85 |
| n-paraffins | | 3.64 | 4.79 | 5.01 | 8.14 |
| cycl-olefines | | 2.95 | 2.47 | 2.23 | 1.51 |
| i-olefines | | 13.94 | 13.17 | 12.34 | 6.38 |
| n-olefines | | 8.66 | 6.76 | 6.43 | 2.07 |
| aromatics | | 30.23 | 31.05 | 31.36 | 30.97 |
| >200° C. | | 7.91 | 8.14 | 7.93 | 8.28 |
| RON | ASTM D-2699 | 91.4 | 90.4 | 90.2 | 84.5 |
| MON | ASTM D-2700 | 80.5 | 80.4 | 80.4 | 78.4 |

In FIG. 1 the RON and MON number are reported as function of ppm S in the product, for the examples 29–35, wherein the catalysts 6 and 12–17 are tested in upgrading of a full range naphtha with the composition reported in table 4.

The invention claimed is:

1. A catalyst containing a metal of group VIII, a metal of group VI, a metal oxide as carrier and FER zeolite, wherein the FER zeolite is present in a quantity ranging from 5 to 30% by weight with respect to the total weight of the catalyst, prepared as follows:
   a) an alcohol dispersion is prepared, containing a soluble salt of the metal of group VIII, the zeolite of the FER group and an organic source of Aluminum;
   b) an aqueous solution is prepared, containing a soluble salt of the metal of group VI and optionally formamide;
   c) the alcohol dispersion and the aqueous solution are mixed, obtaining a gel;

d) aging of the gel at a temperature ranging from 10 to 40° C.;
e) drying of the gel;
f) calcination of the gel.

2. A catalyst according to claim 1, wherein said catalyst has a surface area greater than 300 m²/g.

3. A catalyst which comprise a metal of group VIII, a metal of group VI, a metal oxide as carrier, FER zeolite, wherein the FER zeolite is present in a quantity ranging from 5 to 30% by weight with respect to the total weight of the catalyst, and phosphorous in a quantity ranging from 0.1 to 10%.

4. The catalyst according to claim 3 containing phosphorous in a quantity ranging from 1 to 5% wt with respect to the total weight of the catalyst.

5. A process for preparing the catalyst of claim 3 comprising the following steps:
   a) an alcohol dispersion is prepared, containing a soluble salt of the metal of group VIII, the zeolite of FER type and an organic source of aluminum;
   b) an aqueous solution is prepared, containing a soluble salt of the metal of group VI, $H_3PO_4$ and optionally formamide;
   c) the alcohol dispersion and the aqueous solution are mixed, obtaining a gel;
   d) aging of the gel at a temperature ranging from 10 to 40° C.;
   e) drying of the gel;
   f) calcination of the gel.

6. A process for preparing the catalyst of clam 3 comprising the following steps:
   a) an alcohol dispersion is prepared, containing a soluble salt of the metal of group VIII, a zeolite of FER type and an organic source of aluminum;
   b) an aqueous solution is prepared, containing a soluble salt of the metal of group VI, and optionally formamide;
   c) the alcohol dispersion and the aqueous solution are mixed, obtaining a gel;
   d) aging of the gel at a temperature ranging from 10 to 40° C.;
   e) drying of the gel;
   f) calcination of the gel;
   g) impregnation of the catalyst obtained from step f) with an aqueous solution of $H_3PO_4$, drying and calcination.

7. A process for preparing the catalyst of claim 3 comprising:
   a) impregnation of metal oxide with an aqueous solution of $H_3PO_4$, drying and calcination,
   b) impregnation of the material resulting from step a) with an aqueous solution of metal of group VIII and an aqueous solution of metal of group VI,
   c) drying and calcination of the material resulting from step b)
   d) mixing the impregnated metal oxide obtained from step c) with the zeolite of FER type.

8. A catalyst which comprises a metal of group VIII, a metal of group VI, a metal oxide as carrier, FER zeolite, wherein the FER zeolite is present in a quantity ranging from 5 to 30% by weight with respect to the total weight of the catalyst, and P, wherein P is present in a quantity ranging from 0.1 to 10% weight with respect to the total weight of the catalyst, prepared by impregnation of the metal oxide carrier with an aqueous solution of $H_3PO_4$ followed by impregnation with an aqueous solution of the metal of group VIII and an aqueous solution of the metal of group VI.

9. A catalyst which comprises a metal of group VIII, a metal of group VI, a metal oxide as carrier, FER zeolite, wherein the FER zeolite is present in a quantity ranging from 5 to 30% by weight with respect to the total weight of the catalyst, and P, wherein P is present and P in a quantity ranging from 0.1 to 10% weight with respect to the total weight of the catalyst, prepared by drying and calcination of a gel obtained mixing an alcohol dispersion containing a soluble salt of the metal of group VIII and an organic source of aluminum with an aqueous solution containing a soluble salt of the metal of group VI and $H_3PO_4$.

10. A catalyst which comprises a metal of group VIII, a metal of group VI, a metal oxide as carrier, FER zeolite, wherein the FER zeolite is present in a quantity ranging from 5 to 30% by weight with respect to the total weight of the catalyst, and P, wherein P is present and P in a quantity ranging from 0.1 to 10% weight with respect to the total weight of the catalyst, prepared by impregnation with an aqueous solution of $H_3PO_4$ of a gel, dried and calcined, obtained mixing an alcohol dispersion containing a soluble salt of the metal of group VIII and an organic source of aluminum with an aqueous solution containing a soluble salt of the metal of group VI.

11. The catalyst according to claim 8 comprising phosphorous in a quantity ranging from 1 to 5% wt with respect to the total weight of the catalyst.

12. The catalyst according to claim 9 comprising phosphorous in a quantity ranging from 1 to 5% wt with respect to the total weight of the catalyst.

13. The catalyst according to claim 10 comprising phosphorous in a quantity ranging from 1 to 5% wt with respect to the total weight of the catalyst.

* * * * *